United States Patent
Schmidt (10) Patent No.: US 10,103,826 B2
(45) Date of Patent: Oct. 16, 2018

(54) TESTING DEVICE AND TESTING METHOD WITH A FADING SIMULATOR

(71) Applicant: Rohde & Schwarz GmbH & Co. KG, Munich (DE)

(72) Inventor: Stefan Schmidt, Munich (DE)

(73) Assignee: Rohde & Schwarz GmbH & Co. KG, Munich (DE)

(*) Notice: Subject to any disclaimer, the term of this patent is extended or adjusted under 35 U.S.C. 154(b) by 5 days.

(21) Appl. No.: 15/198,184

(22) Filed: Jun. 30, 2016

(65) Prior Publication Data
US 2018/0006741 A1  Jan. 4, 2018

(51) Int. Cl.
| H03H 7/30 | (2006.01) |
| H03M 13/00 | (2006.01) |
| H04B 17/23 | (2015.01) |
| H04L 27/04 | (2006.01) |
| H04L 25/03 | (2006.01) |

(52) U.S. Cl.
CPC ....... H04B 17/23 (2015.01); H04L 25/03343 (2013.01); H04L 27/04 (2013.01)

(58) Field of Classification Search
CPC ....... H04L 27/04; H04L 1/0041; H04L 27/12; H04L 27/36; H04L 27/20; H04L 1/0045; H04L 1/0044; H04L 25/03343; H04L 25/03885; H04L 5/143
USPC .......................................... 375/231; 714/776
See application file for complete search history.

(56) References Cited

U.S. PATENT DOCUMENTS

| 7,480,328 B2 | 1/2009 | Pauly et al. |
| 2012/0178361 A1* | 7/2012 | Hayashi ............... H04B 7/0669 455/10 |
| 2016/0286418 A1* | 9/2016 | Suenaga ............... H04W 24/06 |

FOREIGN PATENT DOCUMENTS

| CN | 102207986 | 12/2014 |
| GB | 624973 | 7/1947 |
| GB | 2444749 | 11/2009 |

* cited by examiner

*Primary Examiner* — Sam K Ahn
*Assistant Examiner* — Sarah Hassan
(74) *Attorney, Agent, or Firm* — Lee & Hayes, PLLC (57) ABSTRACT

A testing device (3), especially a fading simulator incorporating antenna and circuit parameters, for testing a device under test (6), comprises a signal generating unit (4) and a fading simulation unit (5). The signal generating unit (4) generates a first number of signals according to a number of transmitting means (1) for a simulated transmission to the device under test (6). The fading simulation unit (5) outputs a second number of faded signals, which corresponds to a number of receiving means (2) of the device under test (6), to the device under test (6). It simulates the transmission channels between said transmitting means (1) and said receiving means (2) with the aid of an extended channel correlation matrix comprising a channel correlation matrix based on receive antenna characteristics of the device under test (6).

8 Claims, 9 Drawing Sheets

TESTING DEVICE AND TESTING METHOD WITH A FADING SIMULATOR

TECHNICAL FIELD

The invention relates to a testing device, with a fading simulator especially incorporating antenna and circuit parameters, and a method for testing a device under test with respect to wireless communication, especially with respect to fading.

BACKGROUND ART

Generally, in times of an increasing number of wireless communication applications employing MIMO (Multiple Input Multiple Output) systems such as LTE (Long Term Evolution), there is a growing need of a testing device and a testing method for testing devices under test applying such systems.

U.S. Pat. No. 7,480,328 B2 discloses a signal generator for generating a digitally modulated radio-frequency signal, the signal generator having a fading unit but only a single RF (radio frequency) output. As this signal generator has just one RF output it is therefore not suitable as a testing device for testing devices under test having multiple inputs, or multiple outputs respectively. Furthermore, due to the single RF output, testing a device under test with respect to fading based on multiple signal paths between transmitter and receiver is also not possible. However, investigating the phenomenon of fading typically occurring at wireless communications is very important because of its great impact on signal quality.

Accordingly, there is a need to provide a testing device and testing method for testing devices under test having multiple inputs, respectively multiple outputs, and for investigating the phenomenon of fading.

SUMMARY OF THE INVENTION

According to a first aspect of the invention, a testing device for testing a device under test is provided. The testing device comprises a signal generating unit and a fading simulation unit. The signal generating unit is configured to generate a first number of signals according to a number of transmitting means Ntx for a simulated transmission to a device under test. The fading simulation unit is configured to output a second number of faded signals to the device under test. The second number of faded signals corresponds to a number of receiving means Nrx of the device under test. Furthermore, the fading simulation unit simulates the transmission channels between said transmitting means and said receiving means with the aid of an extended channel correlation matrix $R_{\tilde{H}_{DL}}$ comprising a channel correlation matrix $R_{H_{DL}}$, wherein the extended channel correlation matrix $R_{\tilde{H}_{DL}}$ is based on receive antenna characteristics of the device under test and/or transmit antenna characteristics.

According to a first preferred implementation form of the first aspect, the receive antenna characteristics and/or the transmit antenna characteristics are expressed by S-parameters or T-parameters or Y-parameters or Z-parameters or H-parameters or ABCD-parameters or M-parameters or X-parameters or equivalent network parameters.

According to a further preferred implementation form of the first aspect, the extended channel correlation matrix $R_{\tilde{H}_{DL}}$ additionally comprises first parameters characterizing at least a part of each receiver path within the device under test.

According to a further preferred implementation of the first aspect, the extended channel correlation matrix $R_{\tilde{H}_{DL}}$ additionally comprises second parameters characterizing at least a part of each transmitter path within the testing device.

According to a further preferred implementation form of the first aspect, the first parameters and the second parameters are S-parameters or T-parameters or Y-parameters or Z-parameters or H-parameters or ABCD-parameters or M-parameters or X-parameters or equivalent network parameters.

According to a further preferred implementation form of the first aspect, the extended channel correlation matrix $R_{\tilde{H}_{DL}}$ is normalized to achieve a specific channel power and has the structure $$R_{\tilde{H}_{DL}} = \frac{1}{c} * M * R_{H_{DL}} * M^H,$$

wherein c is a normalization constant with $c \in \mathbb{C}$ or $c \in \mathbb{R}$, M is a matrix with $M \in \mathbb{C}^{(Ntx*Nrx) \times (Ntx*Nrx)}$, and $M^H$ denotes the Hermitian transpose of M.

According to a further preferred implementation form of the first aspect, the extended channel correlation matrix $R_{\tilde{H}_{DL}}$ is normalized and numerically stabilized to avoid non-solvable equations, the extended channel correlation matrix having the structure $$R_{\tilde{H}_{DL}} = \left[\frac{1}{c} * M * R_{H_{DL}} * M^H + a * I_{Ntx*Nrx}\right] / (1+a),$$

wherein a is a scaling factor with $a \in \mathbb{R}$, and
$I_{Ntx*Nrx}$ is a $(Ntx*Nrx) \times (Ntx*Nrx)$ identity matrix,
M is a matrix with $M \in \mathbb{C}^{(Ntx*Nrx) \times (Ntx*Nrx)}$, and
$M^H$ denotes the Hermitian transpose of M.

According to a further preferred implementation form of the first aspect, the transmitting means are considered as a Ntx-port network. The receiving means are considered as a Nrx-port network. Furthermore, the matrix M has the structure $$M = (((I_{Ntx} - \Gamma_{B,T} * S_{B,A})^{-1} * T_{B,T})^T \otimes (T_{UE,R} * (I_{Nrx} - S_{UE,A} * \Gamma_{UE,R})^{-1})),$$

wherein $I_{Ntx}$ is a $Ntx \times Ntx$ identity matrix,
$I_{Nrx}$ is a $Nrx \times Nrx$ identity matrix,
$S_{B,A}$ is the S-parameter matrix of the Ntx-port network,
$S_{UE,A}$ is the S-parameter matrix of the Nrx-port network,
$\Gamma_{B,T}$ is a diagonal matrix $\Gamma_{B,T} = \text{diag}\{[\Gamma_{B,T}^{(1)}, \ldots, \Gamma_{B,T}^{(Ntx)}]\} \in \mathbb{C}^{Ntx \times Ntx}$ comprising the reflection coefficients $\Gamma_{B,T}^{(1)}, \ldots, \Gamma_{B,T}^{(Ntx)}$ of each transmitter path,
$\Gamma_{UE,R}$ is diagonal matrix $\Gamma_{UE,R} = \text{diag}\{[\Gamma_{UE,R}^{(1)}, \ldots, \Gamma_{UE,R}^{(Nrx)}]\} \in \mathbb{C}^{Nrx \times Nrx}$ comprising the reflection coefficients $\Gamma_{UE,R}^{(1)}, \ldots, \Gamma_{UE,R}^{(Nrx)}$ of each receiver path,
$T_{B,T}$ is a diagonal matrix $T_{B,T} = \text{diag}\{[T_{B,T}^{(1)}, \ldots, T_{B,T}^{(Ntx)}]\} \in \mathbb{C}^{Ntx \times Ntx}$ comprising the transmission coefficients $T_{B,T}^{(1)}, \ldots, T_{B,T}^{(Ntx)}$ of each transmitter path, and
$T_{UE,R}$ is diagonal matrix $T_{UE,R} = \text{diag}\{[T_{UE,R}^{(1)}, \ldots, T_{UE,R}^{(Nrx)}]\} \in \mathbb{C}^{Nrx \times Nrx}$ comprising the transmission coefficients $T_{UE,R}^{(1)}, \ldots, T_{UE,R}^{(Nrx)}$ of each receiver path.

The operator $(\ )^{-1}$ inverts a matrix, the operator $(\ )^T$ transposes a matrix, and the operator $\otimes$ denotes the Kronecker product of matrices.

According to a second aspect of the invention, a testing method for testing a device under test is provided. The method comprises generating a first number of signals according to a number of transmitting means Ntx for a simulated transmission to a device under test and simulating the transmission channels between said transmitting means and a number of receiving means Nrx of the device under test with the aid of an extended channel correlation matrix $R_{\tilde{H}_{DL}}$ comprising a channel correlation matrix $R_{\tilde{H}_{DL}}$, wherein the extended channel correlation matrix $R_{\tilde{H}_{DL}}$ is based on receive antenna characteristics of the device under test and/or transmit antenna characteristics. Moreover, a second number of faded signals is output to the device under test, the second number of faded signals corresponding to. the number of receiving means Nrx of the device under test.

According to a first preferred implementation form of the second aspect, the receive antenna characteristics and/or the transmit antenna characteristics are expressed by S-parameters or T-parameters or Y-parameters or Z-parameters or H-parameters or ABCD-parameters or M-parameters or X-parameters or equivalent network parameters.

According to a further preferred implementation of the second aspect, the extended channel correlation matrix $R_{\tilde{H}_{DL}}$ additionally comprises first parameters characterizing at least a part of each receiver path within the device under test.

According to a further preferred implementation of the second aspect, the extended channel correlation matrix $R_{\tilde{H}_{DL}}$ additionally comprises second parameters characterizing at least a part of each transmitter path within the testing device.

According to a further preferred implementation of the second aspect, the first parameters and the second parameters are S-parameters or T-parameters or Y-parameters or Z-parameters or H-parameters or ABCD-parameters or M-parameters or X-parameters or equivalent network parameters.

According to a further preferred implementation of the second aspect, the extended channel correlation matrix $R_{\tilde{H}_{DL}}$ is normalized to achieve a specific channel power and has the structure $$R_{\tilde{H}_{DL}} = \frac{1}{c} * M * R_{H_{DL}} * M^H,$$

wherein c is a normalization constant with $c \in \mathbb{C}$ or $c \in \mathbb{R}$,
M is a matrix with $M \in \mathbb{C}^{(Ntx*Nrx)\times(Ntx*Nrx)}$, and
$M^H$ denotes the Hermitian transpose of M.

According to a further preferred implementation of the second aspect, the extended channel correlation matrix is normalized and numerically stabilized to avoid non-solvable equations, the extended channel correlation matrix $R_{\tilde{H}_{DL}}$ having the structure $$R_{\tilde{H}_{DL}} = \left[\frac{1}{c} * M * R_{H_{DL}} * M^H + a * I_{Ntx*Nrx}\right] / (1+a),$$

wherein a is a scaling factor with $a \in \mathbb{R}$, and
$I_{Ntx*Nrx}$ is a (Ntx*Nrx)×(Ntx*Nrx) identity matrix,
M is a matrix with $M \in \mathbb{C}^{(Ntx*Nrx)\times(Ntx*Nrx)}$, and
$M^H$ denotes the Hermitian transpose of M.

According to a further preferred implementation of the second aspect, the transmitting means are considered as a Ntx-port network. The receiving means are considered as a Nrx-port network. Furthermore, the matrix M has the structure $$M = (((I_{Ntx} - \Gamma_{B,T} * S_{B,A})^{-1} * T_{B,T})^T \otimes (T_{UE,R} * (I_{Nrx} - S_{UE,A} * \Gamma_{UE,R})^{-1})),$$

wherein $I_{Ntx}$ is a Ntx×Ntx identity matrix,
$I_{Nrx}$ is a Nrx×Nrx identity matrix,
$S_{B,A}$ is the S-parameter matrix of the Ntx-port network,
$S_{UE,A}$ is the S-parameter matrix of the Nrx-port network,
$\Gamma_{B,T}$ is a diagonal matrix $\Gamma_{B,T}=\text{diag}\{[\Gamma_{B,T}^{(1)}, \ldots, \Gamma_{B,T}^{(Ntx)}]\} \in \mathbb{C}^{Ntx\times Ntx}$ comprising the reflection coefficients $\Gamma_{B,T}^{(1)}, \ldots, \Gamma_{B,T}^{(Ntx)}$ of each transmitter path,
$\Gamma_{UE,R}$ is diagonal matrix $\Gamma_{UE,R}=\text{diag}\{[\Gamma_{UE,R}^{(1)}, \ldots, \Gamma_{UE,R}^{(Nrx)}]\} \in \mathbb{C}^{Nrx\times Nrx}$ comprising the reflection coefficients $\Gamma_{UE,R}^{(1)}, \ldots, \Gamma_{UE,R}^{(Nrx)}$ of each receiver path,
$T_{B,T}$ is a diagonal matrix $T_{B,T}=\text{diag}\{[T_{B,T}^{(1)}, \ldots, T_{B,T}^{(Ntx)}]\} \in \mathbb{C}^{Ntx\times Ntx}$ comprising the transmission coefficients $T_{B,T}^{(1)}, \ldots, T_{B,T}^{(Ntx)}$ of each transmitter path, and
$T_{UE,R}$ is diagonal matrix $T_{UE,R}=\text{diag}\{[T_{UE,R}^{(1)}, \ldots, T_{UE,R}^{(Nrx)}]\} \in \mathbb{C}^{Nrx\times Nrx}$ comprising the transmission coefficients $T_{UE,R}^{(1)}, \ldots, T_{UE,R}^{(Nrx)}$ of each receiver path.

The operator $(\ )^{-1}$ inverts a matrix, the operator $(\ )^T$ transposes a matrix, and the operator $\otimes$ denotes the Kronecker product of matrices.

According to a third aspect of the invention, a computer program with program code means for performing all steps according to the second aspect, if the program is executed on a computer device or digital signal processor, is provided.

BRIEF DESCRIPTION OF THE DRAWINGS

Exemplary embodiments of the invention are now further explained with respect to the drawings by way of example only, and not for limitation. In the drawings.

DETAILED DESCRIPTION OF THE PREFFERED EMBODIMENTS

In advance, before exemplary embodiments of the invention are explained with respect to the drawings by way of example, it should be mentioned that, even though the following explanations focus on data transmission from a base station (BS) to user equipment (UE), in other words, the following refers to the downlink channel, the present invention can however analogously be adapted to the uplink channel.

In addition to this, the following definitions apply:

Operators $(\ )^*$, $(\ )^T$ and $(\ )^H$ denote the conjugate complex, the transpose and the Hermitian transpose of a matrix (or vector) respectively.

Furthermore, let $A \in \mathbb{C}^{M \times N}$ $$A = \begin{bmatrix} A[1,1] & \cdots & A[1,N] \\ \vdots & \ddots & \vdots \\ A[M,1] & \cdots & A[M,N] \end{bmatrix}$$

then the vectorization operator vec( ) is defined such that $vec(A)=(A[1,1], \ldots, A[M,1], A[1,2], \ldots, A[M,2], \ldots, A[1,N], \ldots, A[M,N])^T$ i.e. vec(A) produces a column vector in $\mathbb{C}^{(M*N) \times 1}$ with the columns of A stacked on top of each other.

Additionally, the unvec( ) operator is defined inversely such that $$A = unvec(vec(A)).$$

Moreover, let $B \in \mathbb{C}^{M \times N}$ $$B = \begin{bmatrix} B[1,1] & \cdots & B[1,N] \\ \vdots & \ddots & \vdots \\ B[M,1] & \cdots & B[M,N] \end{bmatrix}$$

then the element wise matrix product · is defined such that $$A \cdot B = \begin{bmatrix} A[1,1]*B[1,1] & \cdots & A[1,N]*B[1,N] \\ \vdots & \ddots & \vdots \\ A[M,1]*B[M,1] & \cdots & A[M,N]*B[M,N] \end{bmatrix}.$$

Further, let $C \in \mathbb{C}^{N \times N}$ be Hermitian and positive definite. Then, the matrix square root operator $(\ )^{1/2}$ is defined implicitly as $$(C^{1/2})^H * C^{1/2} = C.$$

$C^{1/2}$ can be determined through cholesky decomposition of C.

Furthermore, let $A(t) \in \mathbb{C}^{M \times N}$ and $B(t) \in \mathbb{C}^{M \times N}$ where t is the continuous time then the convolution operator $\circledast$ is defined through $$A(t) \circledast B(t) = \begin{bmatrix} A[1,1](t) \circledast B[1,1](t) & \cdots & A[1,N](t) \circledast B[1,N](t) \\ \vdots & \ddots & \vdots \\ A[M,1](t) \circledast B[M,1](t) & \cdots & A[M,N](t) \circledast B[M,N](t) \end{bmatrix} =$$

$$\begin{bmatrix} \int_0^t A[1,1](\tau)*B[1,1](t-\tau)d\tau & \cdots & \int_0^t A[1,N](\tau)*B[1,N](t-\tau)d\tau \\ \vdots & \ddots & \vdots \\ \int_0^t A[M,1](\tau)*B[M,1](t-\tau)d\tau & \cdots & \int_0^t A[M,N](\tau)*B[M,N](t-\tau)d\tau \end{bmatrix}.$$

Furthermore, in case of a discrete time system, the continuous time t must be replaced by n*T, wherein T is the sampling interval and n is an integer sample index. Writing n instead of n*T for the sake of brevity, the convolution operator $\circledast$ is then defined through $$A(n) \circledast B(n) = \begin{bmatrix} A[1,1](n) \circledast B[1,1](n) & \cdots & A[1,N](n) \circledast B[1,N](n) \\ \vdots & \ddots & \vdots \\ A[M,1](n) \circledast B[M,1](n) & \cdots & A[M,N](n) \circledast B[M,N](n) \end{bmatrix} =$$

$$\begin{bmatrix} \sum_{v=0}^{V-1} A[1,1](n-v)*B[1,1](v) & \cdots & \sum_{v=0}^{V-1} A[1,N](n-v)*B[1,N](v) \\ \vdots & \ddots & \vdots \\ \sum_{v=0}^{V-1} A[M,1](n-v)*B[M,1](v) & \cdots & \sum_{v=0}^{V-1} A[M,N](n-v)*B[M,N](v) \end{bmatrix},$$

wherein it has been assumed without loss of generality that $B[i,j](v)=0$ for $v<0$ and $v>V-1$.

Now, let $A \in \mathbb{C}^{M \times N}$ and $B \in \mathbb{C}^{P \times R}$, then the Kronecker product $\otimes$ is defined through $$A \otimes B = \begin{bmatrix} A[1,1]*B & \cdots & A[1,N]*B \\ \vdots & \ddots & \vdots \\ A[M,1]*B & \cdots & A[M,N]*B \end{bmatrix}.$$

Thus, the result of is a (M*P)×(N*R) matrix.

Moreover, as a final introductory definition, the general concept of voltage and current waves should be presented at this point:

Considering an arbitrary N-port microwave network the total voltage and current wave amplitudes at the n-th port are given as $$V_n = V_n^+ + V_n^-$$

and $$I_n = I_n^+ + I_n^-,$$

wherein $(V_n^+, I_n^+)$ denote the incident and $(V_n^-, I_n^-)$ denote the reflected wave amplitudes.

The voltage waves can be generalized to account for the case that different ports have different characteristic impedances, i.e.

$$a_n = \frac{V_n^+}{\sqrt{Z_{0n}}}$$

and $$b_n = \frac{V_n^-}{\sqrt{Z_{0n}}},$$

wherein $a_n$ reperesents an incident wave at the nth port, $b_n$ represents a reflected wave from that port and $Z_{0n}$ is the characteristic impedance of that port.

The relationship between incident and reflected waves can be expressed through the S-parameter matrix $$b = S*a$$

wherein $b = [b_1, \ldots, b_N]^T \in \mathbb{C}^{N \times 1}$, $a = [a_1, \ldots, a_N]^T \in \mathbb{C}^{N \times 1}$ and $S \in \mathbb{C}^{N \times N}$.

Note that b, a and S are considered to be expressed in frequency domain and thereby are functions of frequency (b(f),a(f),S(f)). For the sake of brevity, the frequency symbol will be dropped in the following description.

It should be mentioned that in order to implement the channel models described in the following, it is required to evaluate the wave amplitudes and S-parameters at an appropriate frequency, e.g. the carrier frequency.

Furthermore, it is assumed that each port supports one propagating mode. If a physical port supports more than one propagating mode, additional electrical ports can be added to account for these modes.

Figure 1:
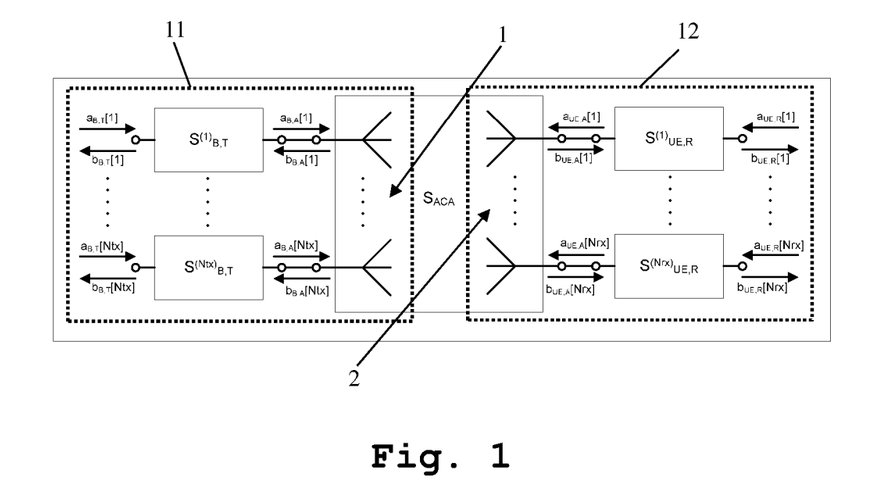
FIG. 1 shows a block diagram of an exemplary voltage wave amplitude model of a mobile downlink channel.

Now, with respect to FIG. 1 a transmitter 11, respectively a BS 11, with Ntx antennas 1 and a receiver 12, respectively UE 12, with Nrx antennas 2 are considered.

In general, the transmission from BS 11 to UE 12 over a mobile radio channel can be modeled as $$y(t) = \Sigma_{l=1}^{L}(H_l(t) \circledast D_l(t)) * x(t-\tau_l) + n(t),$$

wherein t is the time, L is the number of fading paths, $y(t) \in \mathbb{C}^{Nrx \times 1}$ is the vector of received symbols, $x(t) \in \mathbb{C}^{Ntx \times 1}$ is the vector of transmitted symbols, $\tau_l$ is the delay of fading path l, $H_l(t) \in \mathbb{C}^{Nrx \times Ntx}$ is the random channel matrix of fading path l where each entry is zero mean Gaussian, each element of $D_l(t) \in \mathbb{C}^{Nrx \times Ntx}$ corresponds to the impulse response of a filter which determines the time evolution and Doppler spectrum of the fading process and $n(t) \in \mathbb{C}^{Nrx \times 1}$ is the random vector of noise samples where the entries are i.i.d. (independent and identical distributed) zero mean Gaussian.

Equivalently we have for a discrete time system:

$$y(n) = \Sigma_{l=1}^{L}(H_l(n) \circledast D_l(n)) * x(n-\tau_l) + n(n),$$

wherein n is an integer sample index. The relationship between the continuous time t and the sample index n is given through the equation t=n*T where T denotes the sampling period.

The channel correlation matrix is defined as $$R_{H_l} = E\{\text{vec}(H_l(t))^* \text{vec}(H_l(t))^H\} = E\{\text{vec}(H_l(n))^* \text{vec}(H_l(n))^H\},$$

wherein $E\{\ \}$ denotes the expectation operator. In the following subsections we derive the relationship between $H_l(t)$ and $\tilde{H}_l(t)$ equivalently $H_l(n)$ and $\tilde{H}_l(n)$) and hence between $R_{H_l}$ and $R_{\tilde{H}_l}$ where $\tilde{H}_l(t)$ (equivalently $\tilde{H}_l(n)$) is regarded as extended channel matrix that also accounts for the effects of receiver and transmitter circuitry including antennas. In the following the subscript l as well as the symbols for continuous and discrete time (t and n respectively) will be omitted for the sake of brevity.

As already mentioned above, the present explanations focus on the downlink channel $H_{DL}$. However, the derivations can be performed analogously for the uplink channel $H_{UL}$.

Furthermore, these derivations are based on the circuit model shown in FIG. 1, which is grounded on voltage wave amplitudes a and b and the S-parameters—as introduced above—of the occurring circuit components.

According to FIG. 1, the following vectors are to be defined:

$$a_{B,T} = [a_{B,T}[1], \ldots, a_{B,T}[Ntx]]^T \in \mathbb{C}^{Ntx \times 1},$$

$$b_{B,T} = [b_{B,T}[1], \ldots, b_{B,T}[Ntx]]^T \in \mathbb{C}^{Ntx \times 1},$$

$$a_{B,A} = [a_{B,A}[1], \ldots, a_{B,A}[Ntx]]^T \in \mathbb{C}^{Ntx \times 1},$$

$$b_{B,A} = [b_{B,A}[1], \ldots, b_{B,A}[Ntx]]^T \in \mathbb{C}^{Ntx \times 1},$$

$$a_{UE,A} = [a_{UE,A}[1], \ldots, a_{UE,A}[Nrx]]^T \in \mathbb{C}^{Nrx \times 1},$$

$$b_{UE,A} = [b_{UE,A}[1], \ldots, b_{UE,A}[Nrx]]^T \in \mathbb{C}^{Nrx \times 1},$$

$$a_{UE,R} = [a_{UE,R}[1], \ldots, a_{UE,R}[Nrx]]^T \in \mathbb{C}^{Nrx \times 1}, \text{ and}$$

$$b_{UE,R} = [b_{UE,R}[1], \ldots, b_{UE,R}[Nrx]]^T \in \mathbb{C}^{Nrx \times 1}.$$

Furthermore, the following equations apply for the transmitter side with $i \in \mathbb{N}$ and $1 \leq i \leq Ntx$:

The definition of the S-parameter matrix $S_{B,T}^{(i)} \in \mathbb{C}^{2 \times 2}$ of transmitter path i (at BS 11)

$$S_{B,T}^{(i)} = \begin{bmatrix} S_{B,T}^{(i)}[1,1] & S_{B,T}^{(i)}[1,2] \\ S_{B,T}^{(i)}[2,1] & S_{B,T}^{(i)}[2,2] \end{bmatrix}$$

leads to $$\begin{bmatrix} b_{B,T}[i] \\ a_{B,A}[i] \end{bmatrix} = \begin{bmatrix} S_{B,T}^{(i)}[1,1] & S_{B,T}^{(i)}[1,2] \\ S_{B,T}^{(i)}[2,1] & S_{B,T}^{(i)}[2,2] \end{bmatrix} \begin{bmatrix} a_{B,T}[i] \\ b_{B,T}[i] \end{bmatrix}.$$

Moreover, the definition of the channel—including transmitting and receiving antennas—S-parameter matrix $$S_{ACA} = \begin{bmatrix} S_{B,A} & S_{C,UL} \\ S_{C,DL} & S_{UE,A} \end{bmatrix}, S_{ACA} \in \mathbb{C}^{(Ntx+Nrx) \times (Ntx+Nrx)},$$

wherein $S_{B,A} \in \mathbb{C}^{2Ntx \times Ntx}$ is the S-parameter matrix of the antenna array at the BS (the antenna array 1 is considered as a Ntx-port network), $S_{C,UL} \in \mathbb{C}^{2Ntx \times Nrx}$ is the S-parameter matrix of the pure uplink channel, $S_{C,DL} \in \mathbb{C}^{2Nrx \times Ntx}$ is the S-parameter matrix of the pure downlink channel, and $S_{UE,A} \in \mathbb{C}^{2Nrx \times Nrx}$ is the S-parameter matrix of the antenna array at the UE 12 (the antenna array 2 is considered as a Nrx-port network), leads to $$\begin{bmatrix} b_{B,A} \\ b_{UE,A} \end{bmatrix} = \begin{bmatrix} S_{B,A} & S_{C,UL} \\ S_{C,DL} & S_{UE,A} \end{bmatrix} \begin{bmatrix} a_{B,A} \\ a_{UE,A} \end{bmatrix}.$$

Additionally, for the receiver side, the following equations apply:

The definition of the S-parameter matrix $S_{UE,R}^{(i)} \in \mathbb{C}^{2 \times 2}$ of receiver path i (at UE 12) with $1 \leq i \leq Nrx$ $$S_{UE,R}^{(i)} = \begin{bmatrix} S_{UE,R}^{(i)}[1,1] & S_{UE,R}^{(i)}[1,2] \\ S_{UE,R}^{(i)}[2,1] & S_{UE,R}^{(i)}[2,2] \end{bmatrix}$$

leads to $$\begin{bmatrix} a_{UE,A}[i] \\ b_{UE,R}[i] \end{bmatrix} = \begin{bmatrix} S_{UE,R}^{(i)}[1,1] & S_{UE,R}^{(i)}[1,2] \\ S_{UE,R}^{(i)}[2,1] & S_{UE,R}^{(i)}[2,2] \end{bmatrix} \begin{bmatrix} b_{UE,A}[i] \\ a_{UE,R}[i] \end{bmatrix}.$$

Figure 2:
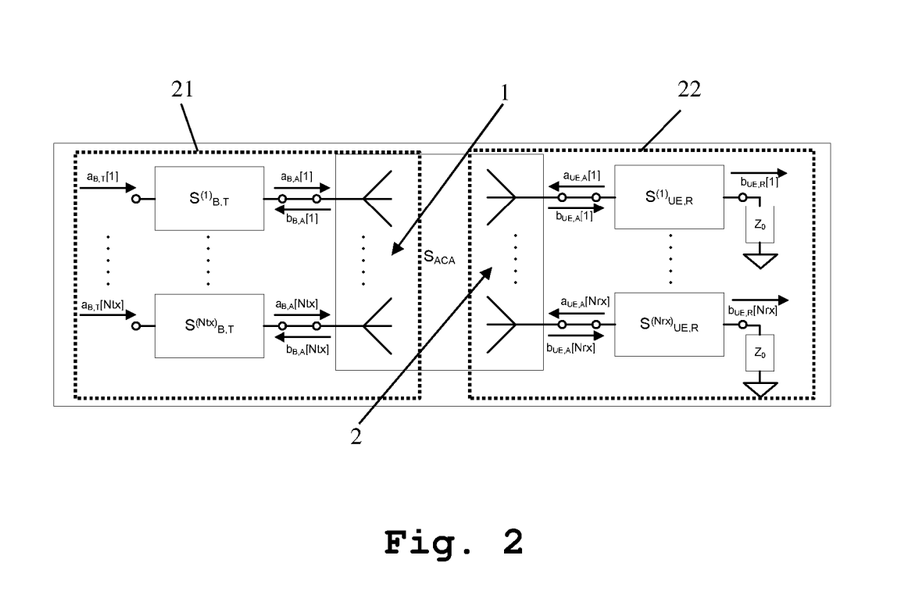
FIG. 2 shows a block diagram of an exemplary simplified voltage wave amplitude circuit model of a mobile downlink channel.

FIG. 2 shows a preferred exemplary voltage wave amplitude model of a mobile downlink channel, which is simplified by assuming that $b_{B,T}=0$, in other words, transmitter side sources are matched and nonreactive, and $a_{UE,R}=0$, in other words, receiver side is matched as illustrated by terminating impedances $Z_0$.

With the aid of these simplifications, the following applies:

$$a_{B,A}[i] = S_{B,T}^{(i)}[2,1] * a_{B,T}[i] + S_{B,T}^{(i)}[2,2] * b_{B,A}[i],$$

$$\begin{bmatrix} a_{UE,A}[i] \\ b_{UE,R}[i] \end{bmatrix} = \begin{bmatrix} S_{UE,R}^{(i)}[1,1] & S_{UE,R}^{(i)}[1,2] \\ S_{UE,R}^{(i)}[2,1] & S_{UE,R}^{(i)}[2,2] \end{bmatrix} \begin{bmatrix} b_{UE,A}[i] \\ a_{UE,R}[i] \end{bmatrix},$$

$$a_{UE,A}[i] = S_{UE,R}^{(i)}[1,1] * b_{UE,A}[i], \text{ and}$$

$$b_{UE,R}[i] = S_{UE,R}^{(i)}[2,1] * b_{UE,A}[i].$$

Furthermore, the definition of the transmission coefficient of the transmitter path i $$T_{B,T}^{(i)} = S_{B,T}^{(i)}[2,1], \text{ and}$$

the definition of the reflection coefficient of the transmitter path i $$\Gamma_{B,T}^{(i)} = S_{B,T}^{(i)}[2,2]$$

lead to $$a_{B,A}[i] = T_{B,T}^{(i)} * a_{B,T}[i] + \Gamma_{B,T}^{(i)} * b_{B,A}[i].$$

Analogously, the definition of the transmission coefficient of the receiver path i $$T_{UE,R}^{(i)} = S_{UE,R}^{(i)}[2,1], \text{ and}$$

the definition of the reflection coefficient of the receiver path i $$\Gamma_{UE,R}^{(i)} = S_{UE,R}^{(i)}[1,1]$$

lead to $$a_{UE,A}[i] = \Gamma_{UE,R}^{(i)} * b_{UE,A}[i], \text{ and}$$

$$b_{UE,R}[i] = T_{UE,R}^{(i)} * b_{UE,A}[i].$$

Moreover, the definition of the matrices $$T_{B,T} = \text{diag}\{[T_{B,T}^{(1)}, \ldots, T_{B,T}^{(Ntx)}]\} \in \mathbb{C}^{Ntx \times Ntx}$$

$$\Gamma_{B,T} = \text{diag}\{[\Gamma_{B,T}^{(1)}, \ldots, \Gamma_{B,T}^{(Ntx)}]\} \in \mathbb{C}^{Ntx \times Ntx},$$

$$T_{UE,R} = \text{diag}\{[T_{UE,R}^{(1)}, \ldots, T_{UE,R}^{(Nrx)}]\} \in \mathbb{C}^{Nrx \times Nrx}, \text{ and}$$

$$\Gamma_{UE,R} = \text{diag}\{[\Gamma_{UE,R}^{(1)}, \ldots, \Gamma_{UE,R}^{(Nrx)}]\} \in \mathbb{C}^{Nrx \times Nrx}$$

leads to the following set of equations:

$$b_{B,A} = S_{B,A} * a_{B,A} + S_{C,UL} * a_{UE,A} \quad (1),$$

$$b_{UE,A} = S_{C,DL} * a_{B,A} + S_{UE,A} * a_{UE,A} \quad (2),$$

$$a_{UE,A} = \Gamma_{UE,R} * b_{UE,A} \quad (3),$$

$$a_{B,A} = T_{B,T} * a_{B,T} + \Gamma_{B,T} * b_{B,A} \quad (4),$$

$$b_{UE,R} = T_{UE,R} * b_{UE,A} \quad (5)$$

In the following, these five equations will be used for deriving the extended channel correlation matrix $R_{\tilde{H}_{DL}}$ (in downlink direction), which is a part of the core of the present invention:

Plugging equation 3 into equation 1 leads to $$b_{UE,A} = S_{C,DL} * a_{B,A} + \quad (6)$$

$$S_{UE,A} * \Gamma_{UE,R} * b_{UE,A} \Rightarrow (I_{Nrx} - S_{UE,A} * \Gamma_{UE,R}) * b_{UE,A} =$$

$$S_{C,DL} * a_{B,A} \Rightarrow b_{UE,A} = (I_{Nrx} - S_{UE,A} * \Gamma_{UE,R})^{-1} * S_{C,DL} * a_{B,A},$$

wherein $I_{Nrx}$ is the Nrx×Nrx identity matrix.

Further combining equations 4 and 1 and assuming that $S_{C,UL} * a_{UE,A} = 0$ leads to $$a_{B,A} = T_{B,T} * a_{B,T} + \Gamma_{B,T} * S_{B,A} * a_{B,A} \Rightarrow (I_{Ntx} - \Gamma_{B,T} * S_{B,A}) * a_{B,A} = \quad (7)$$

$$T_{B,T} * a_{B,T} \Rightarrow a_{B,A} = (I_{Ntx} - \Gamma_{B,T} * S_{B,A})^{-1} * T_{B,T} * a_{B,T},$$

wherein $I_{Ntx}$ is the Ntx×Ntx identity matrix. Now, plugging equation 7 into equation 6 and equation 6 into equation 5 finally results in $$b_{UE,R} = T_{UE,R} * (I_{Nrx} - S_{UE,A} * \Gamma_{UE,R})^{-1} * S_{C,DL} * (I_{Ntx} - \Gamma_{B,T} * S_{B,A})^{-1} * T_{B,T} * a_{B,T} \quad (8)$$

With the aid of the definition $$S_{\tilde{C},DL} = T_{UE,R} * (I_{Nrx} - S_{UE,A} * \Gamma_{UE,R})^{-1} * S_{C,DL} * (I_{Ntx} - \Gamma_{B,T} * S_{B,A})^{-1} * T_{B,T},$$

equation 8 can be written as $$b_{UE,R} = S_{\tilde{C},DL} * a_{B,T},$$

wherein $S_{\tilde{C},DL}$ can be regarded as extended downlink channel that also includes the effects of the transmitter and receiver circuitry as well as the antenna elements. The following applies:

$$S_{\tilde{C},DL} = \tilde{H}_{DL}.$$

In addition to this, for the sake of completeness, it should be mentioned that $S_{C,DL}$ can be seen as downlink channel relating the field components at the base station and the UE antenna elements. The following applies:

$$S_{C,DL} = H_{DL}.$$

Thus, it can be written:

$$\tilde{H}_{DL} = T_{UE,R}*(I_{Nrx} - S_{UE,A}*\Gamma_{UE,R})^{-1}*H_{DL}*(I_{Ntx} - \Gamma_{B,T}*S_{B,A})^{-1}*T_{B,T} \quad (9)$$

Furthermore, with using the matrix algebra relationship $$U = VXW \Leftrightarrow (W^T \otimes V)*\text{vec}(X) = \text{vec}(U),$$

and with factoring equation 9 into $$\underbrace{\tilde{H}_{DL}}_{U} = \underbrace{T_{UE,R}*(I_{Nrx} - S_{UE,A}*\Gamma_{UE,R})^{-1}}_{V} * \underbrace{H_{DL}}_{X} * \underbrace{(I_{Ntx} - \Gamma_{B,T}*S_{B,A})^{-1}*T_{B,T}}_{W},$$

it follows that $$(((I_{Ntx} - \Gamma_{B,T}*S_{B,A})^{-1}*T_{B,T})^T \otimes (T_{UE,R}*(I_{Nrx} - S_{UE,A}*\Gamma_{UE,R})^{-1}))* \text{vec}(H_{DL}) = \text{vec}(\tilde{H}_{DL}).$$

Thus, the correlation matrix of the extended channels can be expressed as:

$$R_{\tilde{H}_{DL}} = E\{\text{vec}(\tilde{H}_{DL})*\text{vec}(\tilde{H}_{DL})^H\} = \quad (10)$$

$$\left(((I_{Ntx} - \Gamma_{B,T}*S_{B,A})^{-1}*T_{B,T})^T \otimes (T_{UE,R}* (I_{Nrx} - S_{UE,A}*\Gamma_{UE,R})^{-1})\right)*E\{\text{vec}(H_{DL})*\text{vec}(H_{DL})^H\}*$$

$$\left(((I_{Ntx} - \Gamma_{B,T}*S_{B,A})^{-1}*T_{B,T})^T \otimes (T_{UE,R}*(I_{Nrx} - S_{UE,A}*\Gamma_{UE,R})^{-1})\right)^H.$$

Moreover, by identifying the correlation matrix of the downlink channels $$R_{H_{DL}} = E\{\text{vec}(H_{DL})*\text{vec}(H_{DL})^H\},$$

and by defining $$M = (((I_{Ntx} - \Gamma_{B,T}*S_{B,A})^{-1}*T_{B,T})^T \otimes (T_{UE,R}*(I_{Nrx} - S_{UE,A}*\Gamma_{UE,R})^{-1}))$$

The correlation matrix of the extended downlink channels $R_{\tilde{H}_{DL}}$ can be expressed in terms of the correlation matrix of the downlink channels $R_{H_{DL}}$ as follows:

$$R_{\tilde{H}_{DL}} = M*R_{H_{DL}}*M^H. \quad (11)$$

Now, some different forms of $R_{H_{DL}}$ will be explained in the following. However, these forms are given by way of example only, and not for limitation.

Firstly, according to the Kronecker channel model, $R_{H_{DL}}$ can be expressed as $$R_{H_{DL}} = R_{BS} \otimes R_{UE},$$

wherein $R_{BS} \in \mathbb{C}^{Ntx \times Ntx}$ is the spatial correlation matrix of the field components at the transmitter side, and $R_{UE} \in \mathbb{C}^{Nrx \times Nrx}$ is the spatial correlation matrix of the field components at the receiver side for the respective fading path.

In the second place, due to antenna polarization, another form of $R_{H_{DL}}$ may incorporate polarization correlation through the expression $$R_{H_{DL}} = X \cdot R_S,$$

wherein $X \in \mathbb{C}^{(Ntx*Nrx) \times (Ntx*Nrx)}$ is a polarization correlation matrix, $R_S \in \mathbb{C}^{(Ntx*Nrx) \times (Ntx*Nrx)}$ is the channel spatial correlation matrix (e.g. $R_S = R_{BS} \otimes R_{UE}$ in case of the Kronecker model) for the respective fading path and · denotes the element wise matrix product.

In addition to this, another method of including polarization correlation into the classical Kronecker model is possible, if a number of pairs of collocated antennas at the transmitter and the receiver is assumed. In this case, the following applies:

$$R_{H_{DL}} = P*(R_{BS} \otimes X \otimes R_{UE})*P^T,$$

wherein $X \in \mathbb{C}^{4 \times 4}$ is a polarization correlation matrix, $R_{BS} \in \mathbb{C}^{Ntx/2 \times Ntx/2}$ is the spatial correlation matrix of the field components at the transmitter side for the respective fading path, $R_{UE} \in \mathbb{C}^{Nrx/2 \times Nrx/2}$ is the spatial correlation matrix of the field components at the receiver side for the respective fading path and P is a (Ntx*Nrx)×(Ntx*Nrx) permutation matrix, wherein each element is either 1 or 0 while each row and each column contains exactly one 1 while the other elements of the respective row or column are 0. The permutation matrix is used in order to map the correlation coefficients in accordance with a specific antenna labelling system.

In the third place, in order to introduce the Spatial Channel Model (SCM/E), $R_{H_{DL}}$ has to be expressed as follows:

$$R_{H_{DL}} = E(\text{vec}(H_{DL})*\text{vec}(H_{DL})^H) =$$

$$E\left(\begin{bmatrix} H_{DL}[1,1]*H_{DL}[1,1]^* & \cdots & H_{DL}[1,1]*H_{DL}[Nrx,Ntx]^* \\ \vdots & \ddots & \vdots \\ H_{DL}[Nrx,Ntx]* & & H_{DL}[Nrx,Ntx]* \\ H_{DL}[1,1]^* & \cdots & H_{DL}[Nrx,Ntx]^* \end{bmatrix}\right).$$

Now, In case of the Spatial Channel Model, the following applies:

$$E(H_{DL}[u,s]*H_{DL}[v,t]^*) = \sigma_{SF}\Sigma_{m=1}^M P_m*G_{BS}(\theta_{m,AoD})* G_{UE}(\theta_{m,AoA})*\exp(j*k* [(d_u-d_v)*\sin(\theta_{m,AoA}) + (d_s-d_t)*\sin(\theta_{m,AoD})]),$$

wherein $u,v \in \{1, \ldots, Nrx\}$ and $s,t \in \{1, \ldots, Ntx\}$ are indices of the receive and transmit antennas respectively, $\sigma_{SF}$ is the lognormal shadow fading, M is the number of subpaths per path, $P_m$ is the power of subpath m, $G_{BS}(\theta_{m,AoD})$ is the BS antenna gain of each array element, $G_{UE}(\theta_{m,AoA})$ is the UE antenna gain of each array element, $j=\sqrt{-1}$, k is the wavenumber $2\pi/\lambda$ where $\lambda$ is the carrier wavelength in meters, $d_u$ and $d_v$ are the distance in meters from UE antenna element u from the reference (u=1) antenna and the distance in meters from UE antenna element v from the reference (v=1) antenna respectively, $d_s$ and $d_t$ are the distance in meters from BS antenna element s from the reference (s=1) antenna and the distance in meters from UE antenna element t from the reference (t=1) antenna respectively, $\theta_{m,AoA}$ is the angle of arrival (AoA) for the subpath m and $\theta_{m,AoD}$ is the angle of departure (AoD) for the subpath m.

Now, some numerical optimizations regarding $R_{H_{DL}}$ should be given in the following. However, it should be mentioned that these optimizations given below are presented by way of example only, and not for limitation.

In the first place, in order to achieve a specific channel power, $R_{H_{DL}}$ according to equation 11 can be normalized:

$$R_{\tilde{H}_{DL}} = \frac{1}{c}*M*R_{H_{DL}}*M^H, \quad (12)$$

wherein $c \in \mathbb{C}$.

Secondly, depending on the computational precision, it may occur that the extended channel correlation matrix $R_{\tilde{H}_{DL}}$ computed according to equation 11 is not positive semi-definite. In this case, $(R_{\tilde{H}_{DL}})^{1/2}$ does not exist and a channel matrix $\tilde{H}_{DL}$ cannot be computed via equation 15 which is introduced later in the present document. This problem can be solved by numeric stabilization with the aid of manipulating equation 11 with a scaling factor $a \in \mathbb{R}$:

$$R_{\tilde{H}_{DL}} = [M * R_{H_{DL}} * M^H + a * I_{Ntx*Nrx}]/(1+a),$$

(13) wherein $I_{Ntx*Nrx}$ is the (Ntx*Nrx)×(Ntx*Nrx) identity matrix.

It would be reasonable to choose a as the smallest possible value that leads to positive semi-definite extended channel correlation matrix $R_{\tilde{H}_{DL}}$.

In the third place, normalization and numeric stabilization may be applied in combination: if the normalized extended channel correlation matrix $R_{\tilde{H}_{DL}}$ according to equation 12 is not positive semi-definite, this problem can be solved according to equation 13 by making use of scaling factor $a \in \mathbb{R}$:

$$R_{\tilde{H}_{DL}} = \left[\frac{1}{c} * M * R_{H_{DL}} * M^H + a * I_{Ntx*Nrx}\right] / (1+a).$$

Now, it should be noted that $H_{DL}$, in other words the above-mentioned downlink channel relating the field components at the base station and the UE antenna elements, may be also computed without incorporating antenna scattering parameters or receiver and transmitter circuitry in the following manner:

$$\text{vec}(H_{DL}) = (R_{H_{DL}})^{1/2} * \text{vec}(G)$$

leading to $$H_{DL} = \text{unvec}(\text{vec}(H_{DL})) = \text{unvec}(R_{H_{DL}})^{1/2} * \text{vec}(G)), \quad (14)$$

wherein G is a Nrx×Ntx random matrix with zero mean i.i.d. (independent identically distributed) complex Gaussian entries.

In addition to this, if the effect of the antenna scattering parameters, receiver and transmitter circuitry shall be included, channel realizations in form of $\tilde{H}_{DL}$, which denotes the above-mentioned extended downlink channel that also includes the effects of the transmitter and receiver circuitry as well as the antenna elements, may be computed as $$\text{vec}(R_{DL}) = (R_{\tilde{H}_{DL}})^{1/2} * \text{vec}(G),$$

which leads to $$\tilde{H}_{DL} = \text{unvec}(\text{vec}(\tilde{H}_{DL})) = \text{unvec}(R_{\tilde{H}_{DL}})^{1/2} * \text{vec}(G)). \quad (15)$$

With respect to equations 14 and 15, it should be additionally mentioned that the channel matrices given in these equations correspond to one fading path. In case of frequency selective fading, several fading paths need to be considered. Thus, for each path, a channel matrix as given above needs to be determined.

Figure 3:
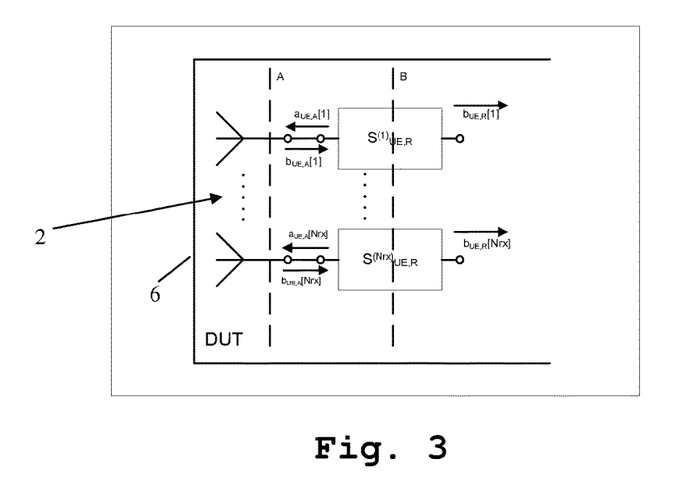
FIG. 3 shows a block diagram of an exemplary device under test with reference planes A and B.
Figure 4:
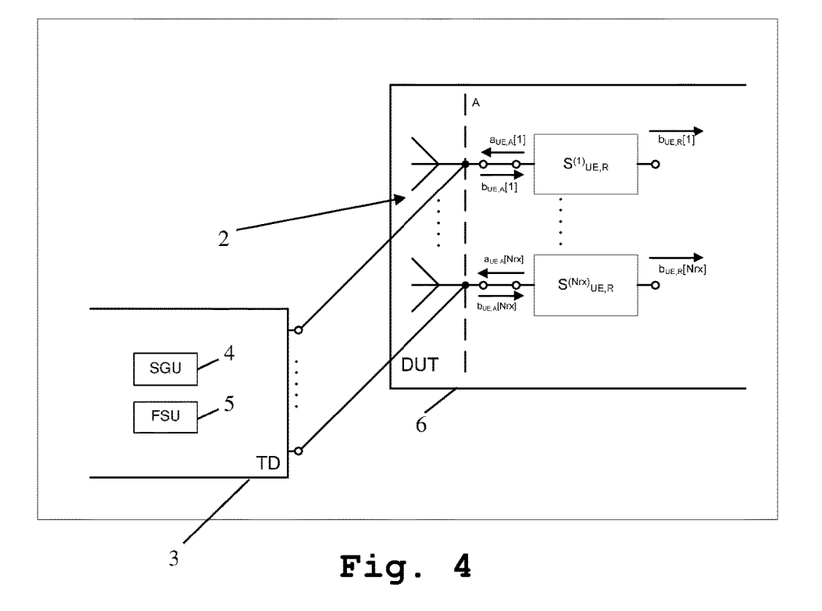
FIG. 4 shows exemplary feeding points on reference plane A.

Now, referring to FIGS. 3 and 4, each of which shows a device under test (DUT) 6 comprising Nrx antennas 2. However, in practice, these antennas are often not part of the test because the testing device (TD) 3, which typically comprises a signal generating unit (SGU) 4 and a fading simulation unit (FSU) 5, is connected to the DUT 6 via cables. Therefore, the test signals from the TD 3 are fed into the DUT 6 at certain feeding points as illustrated by FIG. 3 with the aid of two exemplary reference planes A and B.

Figure 5:
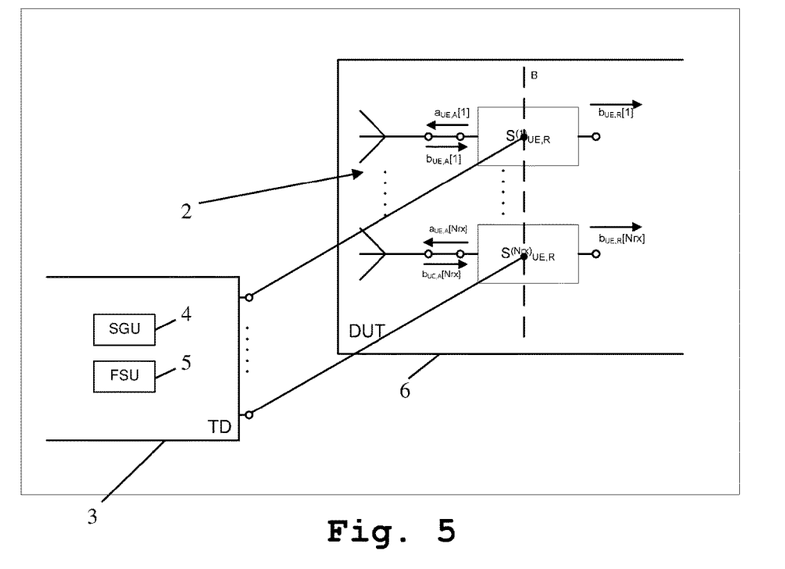
FIG. 5 shows exemplary feeding points on reference plane B.

As a consequence of this example, there are two cases to be distinguished: in the first exemplary case, as illustrated by FIG. 4, the feeding points are on the reference plane A, or in the second case according to FIG. 5, the feeding points are on the reference plane B.

Furthermore, due to the fact that the whole DUT circuitry part seen from the feeding points towards the antennas 2 of the DUT 6 is not part of the measurement, this part needs to be emulated by the TD 3.

Figure 6:
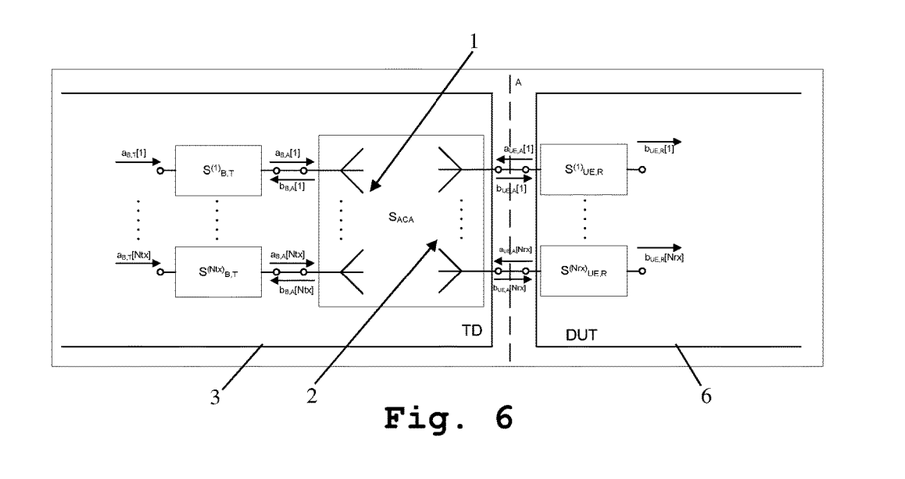
FIG. 6 shows exemplary partitioning for the case that the feeding points are on a reference plane A.

Thus, for the first exemplary case (feeding points on reference plane A), the DUT circuitry is partitioned according to FIG. 6. As it can be seen from FIG. 6, the antennas 2 of the DUT 6 are to be emulated by the TD 3 in this case. Additionally, the corresponding reflection and transmission coefficients, which have already been introduced, may be determined by choosing arbitrary independent values or S-parameters or a combination thereof or the like. For instance, and not for limitation, setting $T_{B,T}^{(i)}=1$ and $\Gamma_{B,T}^{(i)}=0$ for $1 \leq i \leq Ntx$ (transmitter side).

Furthermore, for the receiver side, the coefficients $\Gamma_{UE,R}^{(i)}$ are set to be the reflection coefficients seen from the feeding points on reference plane A looking to the right and $T_{UE,R}^{(i)}=1$.

Figure 7:
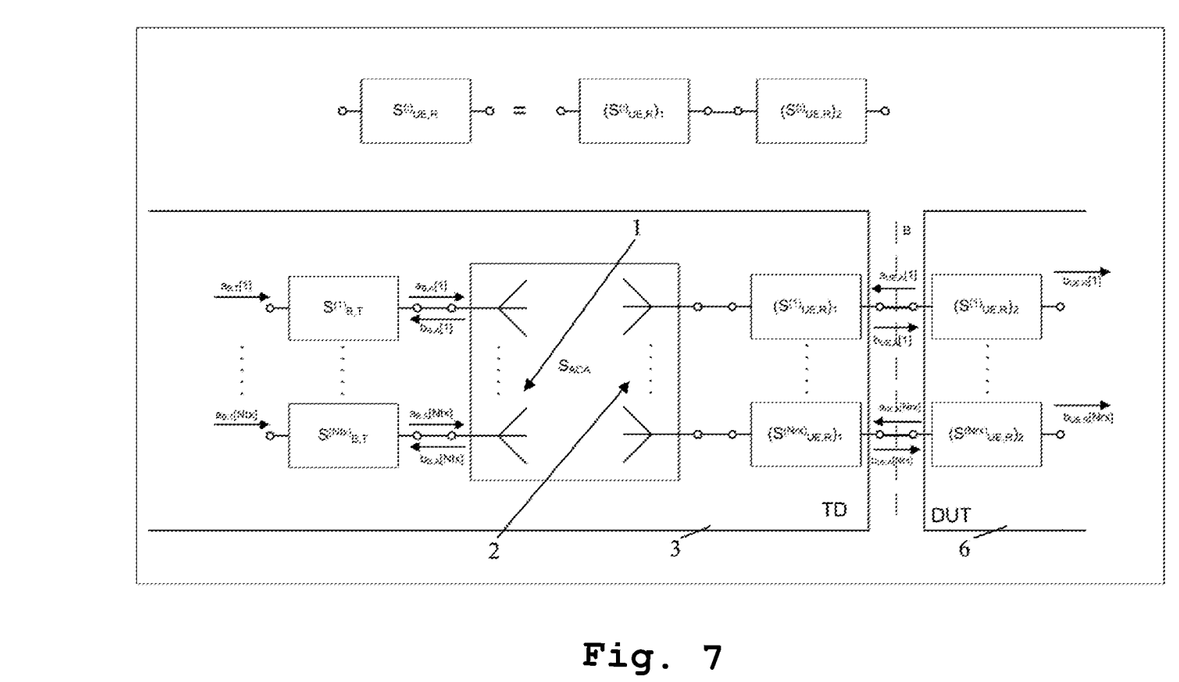
FIG. 7 shows exemplary partitioning for the case that the feeding points are on a reference plane B.

Analogously, for the second exemplary case (feeding points on reference plane B), the DUT circuitry is partitioned according to FIG. 7. In this case, the TD 3 needs not only to emulate the antennas 2 of the DUT 6 but also a further part of the DUT circuitry as illustrated by FIG. 7. Additionally, the corresponding reflection and transmission coefficients may be determined by choosing arbitrary independent values or S-parameters or a combination thereof or the like. By way of example only, and not for limitation, set $T_{B,T}^{(i)}=1$ and $\Gamma_{B,T}^{(i)}=0$ (transmitter side). For the receiver side, the coefficients $\Gamma_{UE,R}^{(i)}$ are set to be the reflection coefficients seen from the feeding points on reference plane B looking to the right and $T_{UE,R}^{(i)}=1$. The S-parameter matrix $S_{UE,A}$ is then no longer the S-parameter matrix of the antenna array 2 at the UE but the S-parameter matrix of the Nrx-port seen from the feeding points on reference plane B looking to the left (towards antennas 2) which in addition to the antennas 2 includes $(S_{UE,R}^{(i)})_1$.

For the sake of clarity and comprehensibility, the above-mentioned different reasonable choices for the parameters) $T_{B,T}^{(i)}$, $\Gamma_{B,T}^{(i)}$, $T_{UE,R}^{(i)}$ and $\Gamma_{UE,R}^{(i)}$ depending on the test purpose should be summarized at this point:

Firstly, arbitrary independent values may be chosen. Thus, for the transmitter side, the following applies: For $1 \leq i \leq Ntx$ choose arbitrary values $T_{B,T}^{(i)} \in \mathbb{C}$ and $\Gamma_{B,T}^{(i)} \in \mathbb{C}$.

For the receiver side, it applies analogously:

For $1 \leq i \leq Nrx$ choose arbitrary values $T_{UE,R}^{(i)} \in \mathbb{C}$ and $\theta_{UE,R}^{(i)} \in \mathbb{C}$.

In the second place, S-parameters may be chosen. Therefore, the following applies for the transmitter side:

For $1 \leq i \leq Ntx$ set $T_{B,T}^{(i)} = S_{B,T}^{(i)}[2,1]$ and $\Gamma_{B,T}^{(i)} = S_{B,T}^{(i)}[2,2]$.

For the receiver side, it applies:

For $1 \leq i \leq Nrx$ set $T_{UE,R}^{(i)} = S_{UE,R}^{(i)}[2,1]$ and $\Gamma_{UE,R}^{(i)} = S_{UE,R}^{(i)}[1,1]$.

Thirdly, reflection and transmission coefficients may be chosen by applying any combination of the variants given above. For instance, and not for limitation, setting $T_{B,T}^{(i)}=1$ and $\Gamma_{B,T}^{(i)}=0$ for $1 \leq i \leq Ntx$, and $T_{UE,R}^{(i)} = S_{UE,R}^{(i)}[2,1]$ and $\Gamma_{UE,R}^{(i)} = S_{UE,R}^{(i)}[1,1]$ for $1 \leq i \leq Nrx$.

Figure 8:
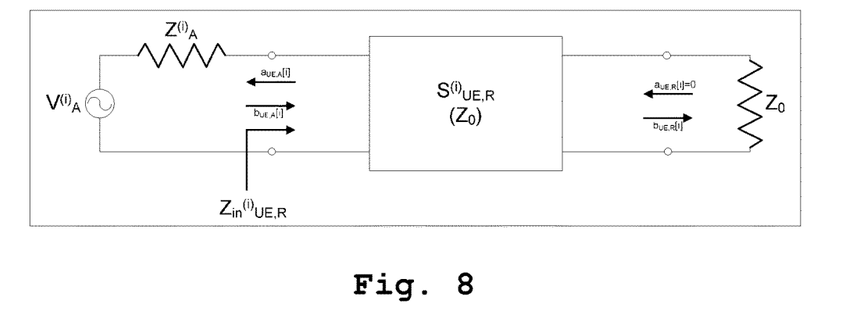
FIG. 8 shows an exemplary equivalent circuit model for receiver path i.

In addition to this, while the reflection and transmission coefficients of the transmitter side are chosen by applying any combination of the variants given above, the reflection and transmission coefficients of the receiver side may be computed based on impedances as follows:

With respect to FIG. 8 that shows an exemplary equivalent circuit model for receiver path i, it can be assumed that receiver path i is matched to antenna port i for maximum power transfer, i.e.

$$Z_{in_{UE,R}}^{(i)} = (Z_A^{(i)})^*,$$

wherein $Z_{in_{UE,R}}^{(i)}$ is the input impedance seen when looking into the input of receiver path i, $Z_A^{(i)}$ is the input impedance seen when looking into receive antenna port i and $V_A^{(i)}$ is the voltage induced at receive antenna i.

Then, the input reflection coefficient $\Gamma_{UE,R}^{(i)}$ is given as $$\Gamma_{UE,R}^{(i)} = \frac{Z_{in_{UE,R}}^{(i)} - Z_0}{Z_{in_{UE,R}}^{(i)} + Z_0} = \frac{(Z_A^{(i)})^* - Z_0}{(Z_A^{(i)})^* + Z_0},$$

wherein $Z_0$ is the characteristic impedance.

It is to be mentioned that knowledge of the input impedance $Z_{in_{UE,R}}^{(i)}$ is not sufficient for the determination of the transmission coefficient $T_{UE,R}^{(i)}$. However, due to the energy conservation law, the following relation must hold:

$$|\Gamma_{UE,R}^{(i)}|^2 + |T_{UE,R}^{(i)}|^2 \le 1,$$

which leads to $$|T_{UE,R}^{(i)}|^2 \le 1 - |\Gamma_{UE,R}^{(i)}|^2$$

while the equality holds in case of a lossless receiver path.

As an approximation, it can be set:

$$T_{UE,R}^{(i)} \sqrt{1 - |\Gamma_{UE,R}^{(i)}|^2}.$$

Furthermore, it may be argued that $S_{UE,R}^{(i)}$ is part of the DUT 6 and therefore already part of the measurement. Thus, the following can be set:

$$T_{UE,R}^{(i)} = 1.$$

Figure 9:
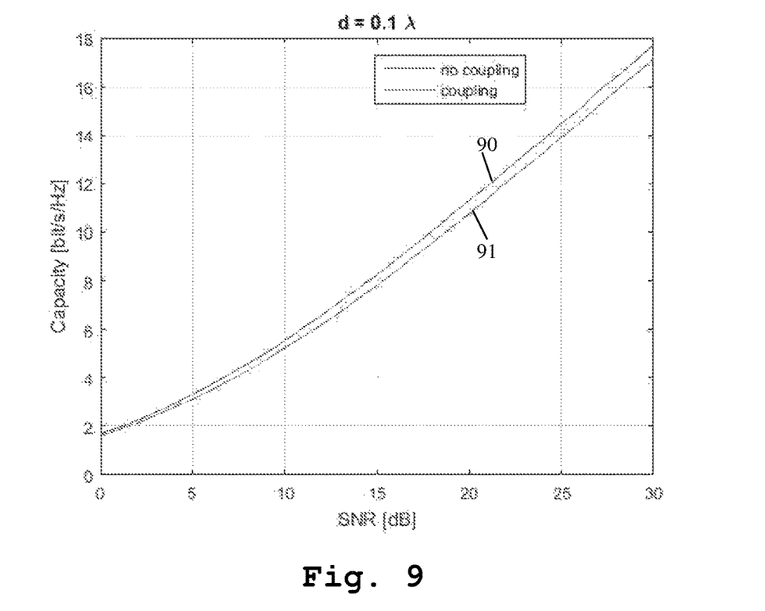
FIG. 9 shows an exemplary diagram illustrating the connectedness between signal-to-noise ratio and channel capacity for low spatial correlation, and the antennas arranged rather closely next to each other.
Figure 10:
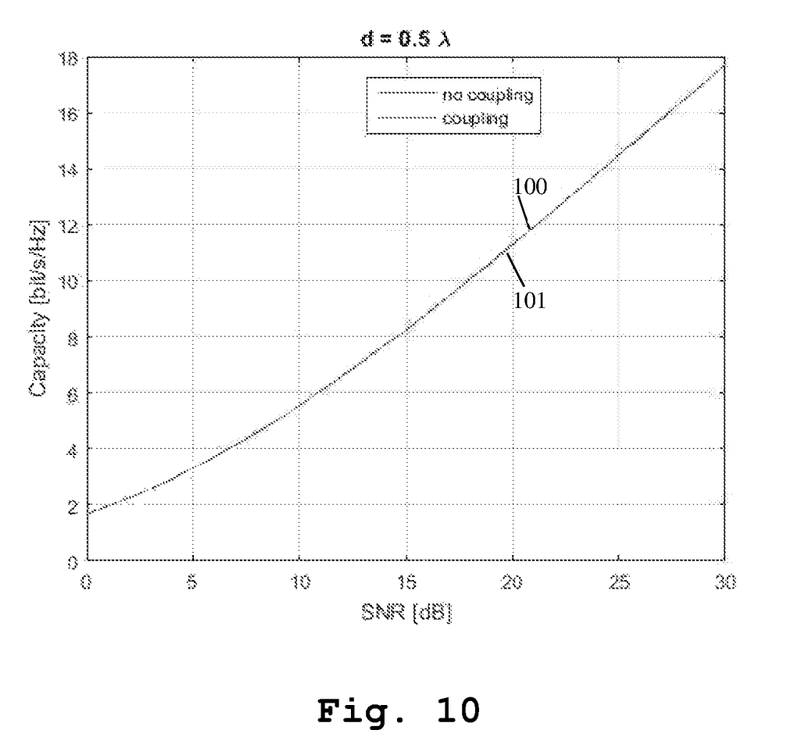
FIG. 10 shows an exemplary diagram illustrating the connectedness between signal-to-noise ratio and channel capacity for low spatial correlation, and the antennas arranged less closely next to each other.

Now, with respect to FIGS. 9 to 12, each of which shows a diagram illustrating the dependency between channel capacity and signal-to-noise ratio, some exemplary simulation results regarding a 2×2-MIMO system are presented in the following:

Firstly, with respect to low spatial correlation, the following is exemplarily set:

$$R_{BS} = \begin{bmatrix} 1 & 0 \\ 0 & 1 \end{bmatrix}, \text{ and}$$

$$R_{UE} = \begin{bmatrix} 1 & 0 \\ 0 & 1 \end{bmatrix}.$$

In addition to this, conjugate match at receiver side (UE) and no antenna coupling at transmitter side (BS) are assumed.

Referring to FIG. 9, arranging the antennas at the receiver side rather closely next to each other—in this case, 0.1 times the wavelength—results in curve 90 for no antenna coupling at the receiver side, or respectively in curve 91 for antenna coupling at the receiver side.

Furthermore, with respect to FIG. 10, arranging the antennas at the receiver side less closely next to each other—in this case, 0.5 times the wavelength—results in curve 100 for no antenna coupling at the receiver side, or respectively in curve 101 for antenna coupling at the receiver side. It is to be mentioned that due to the greater distance between the antennas, curves 100 and 101 are significantly closer together than curves 90 and 91, which leads to an increase in the channel capacity in case of antenna coupling at the receiver side and is therefore advantageous for data transmission.

Figure 11:
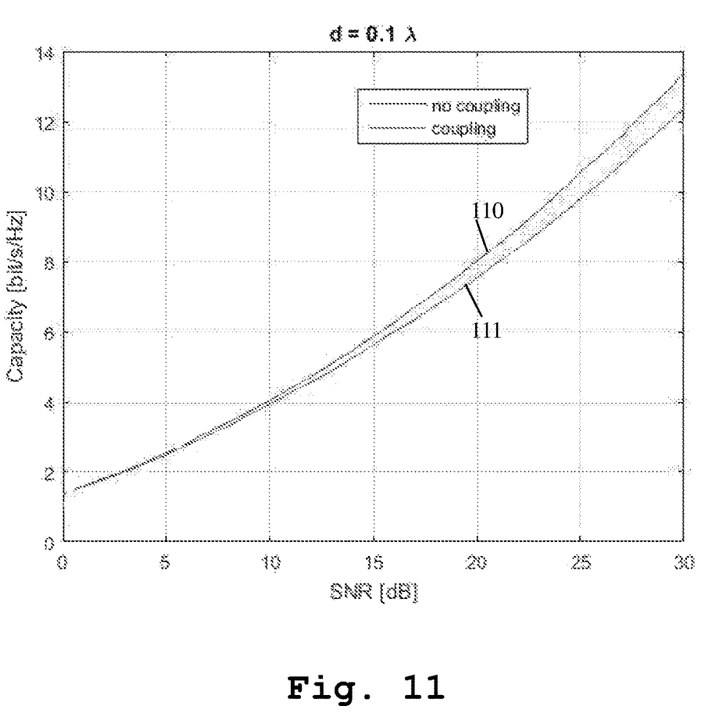
FIG. 11 shows an exemplary diagram illustrating the connectedness between signal-to-noise ratio and channel capacity for high spatial correlation, and the antennas arranged rather closely next to each other.
Figure 12:
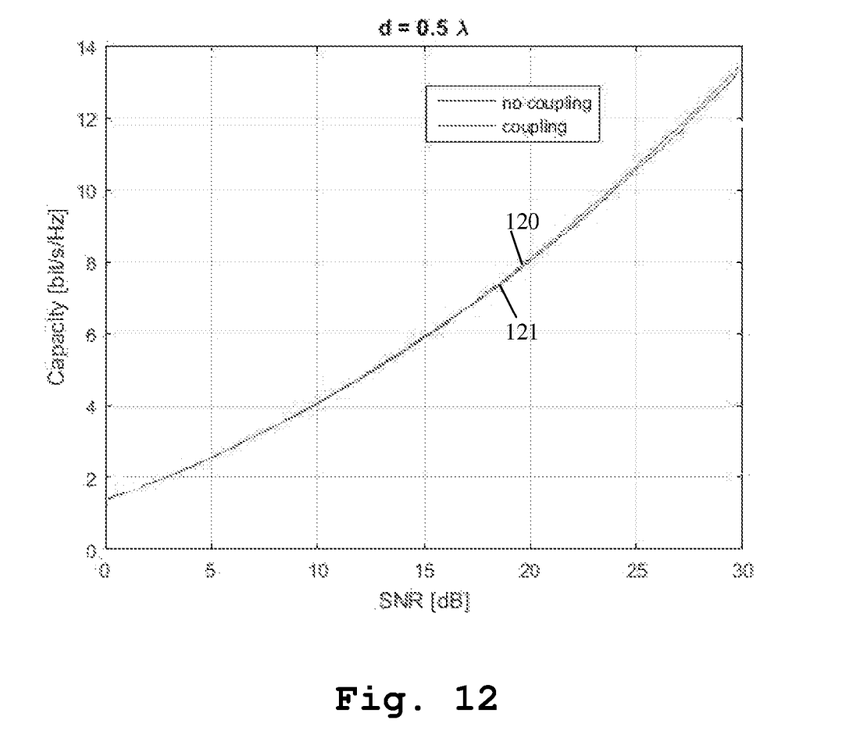
FIG. 12 shows an exemplary diagram illustrating the connectedness between signal-to-noise ratio and channel capacity for high spatial correlation, and the antennas arranged less closely next to each other.

In the second place, with respect to high spatial correlation, the following is exemplarily set:

$$R_{BS} = \begin{bmatrix} 1 & 0.9 \\ 0.9 & 1 \end{bmatrix}, \text{ and}$$

$$R_{UE} = \begin{bmatrix} 1 & 0.9 \\ 0.9 & 1 \end{bmatrix}.$$

Likewise to the exemplary low spatial correlation simulations given above, conjugate match at receiver side (UE) and no antenna coupling at transmitter side (BS) are assumed.

With respect to FIG. 11, arranging the antennas at the receiver side rather closely next to each other—in this case, 0.1 times the wavelength—results in curve 110 for no antenna coupling at the receiver side, or respectively in curve 111 for antenna coupling at the receiver side.

Moreover, referring to FIG. 12, arranging the antennas at the receiver side less closely next to each other—in this case, 0.5 times the wavelength—results in curve 120 for no antenna coupling at the receiver side, or respectively in curve 121 for antenna coupling at the receiver side. In analogy the above-mentioned simulations regarding low spatial correlation, it is to be mentioned that due to the greater distance between the antennas, curves 120 and 121 are significantly closer together than curves 110 and 111, which likewise results in the above-mentioned advantage regarding an increase in the channel capacity in case of antenna coupling at the receiver side.

Figure 13:
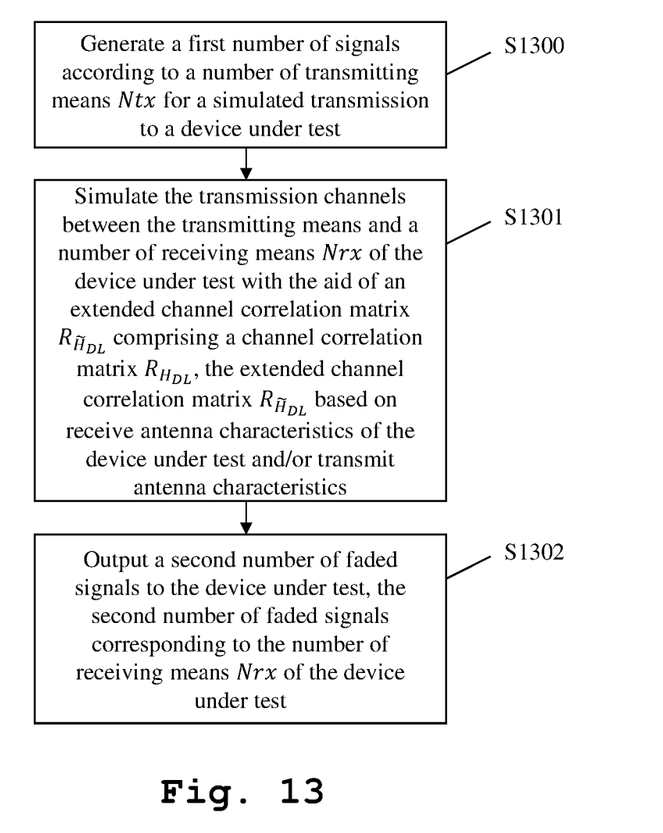
FIG. 13 shows a flow chart of an embodiment of the second aspect of the invention.

Finally, FIG. 13 shows a flow chart of the inventive method. In a first step S1300, a first number of signals according to a number of transmitting means Ntx for a simulated transmission to a device under test is generated. In a second step S1301, the transmission channels between said transmitting means and a number of receiving means Nrx of the device under test are simulated with the aid of an extended channel correlation matrix $R_{\tilde{H}_{DL}}$ comprising a channel correlation matrix $R_{H_{DL}}$; the extended channel correlation matrix $R_{\tilde{H}_{DL}}$ based on receive antenna characteristics of the device under test and/or transmit antenna characteristics. Then, in a third step S1302, a second number of faded signals is output to the device under test, the second number of faded signals corresponding to the number of receiving means Nrx of the device under test.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A testing method for testing a device under test, wherein the testing method comprises the steps of:
generating a first number of signals according to a number of transmitting means Ntx for a simulated transmission to a device under test,
simulating the transmission channels between said transmitting means and a number of receiving means Nrx of the device under test with the aid of an extended channel correlation matrix $R_{\tilde{H}_{DL}}$ comprising a channel correlation matrix $R_{H_{DL}}$, the extended channel correlation matrix $R_{\tilde{H}_{DL}}$ based on receive antenna characteristics of the device under test and/or transmit antenna characteristics, wherein the extended channel correlation matrix is normalized and numerically stabilized to avoid non-solvable equations, the extended channel correlation matrix $R_{\tilde{H}_{DL}}$ having the structure $$R_{\tilde{H}_{DL}} = \left[\frac{1}{c} * M * R_{H_{DL}} * M^H + a * I_{Ntx*Nrx}\right] / (1+a),$$

wherein c is a normalization constant with $c \in \mathbb{C}$,
a is a scaling factor with $a \in \mathbb{R}$,
$I_{Ntx*Nrx}$ is a (Ntx*Nrx)×(Ntx*Nrx) identity matrix,
M is a matrix with $M \in \mathbb{C}^{(Ntx*Nrx) \times (Ntx*Nrx)}$, and
$M_H$ denotes the Hermitian transpose of M, and
outputting a second number of faded signals to the device under test, the second number of faded signals corresponding to the number of receiving means Nrx of the device under test.

2. The testing method according to claim 1, wherein the receive antenna characteristics and/or the transmit antenna characteristics are expressed by S-parameters or T-parameters or Y-parameters or Z-parameters or H-parameters or ABCD-parameters or M-parameters or X-parameters or equivalent network parameters.

3. The testing method according to claim 1, wherein the extended channel correlation matrix $R_{\tilde{H}_{DL}}$ additionally comprises first parameters characterizing at least a part of each receiver path within the device under test.

4. The testing method according to claim 3, wherein the extended channel correlation matrix additionally comprises second parameters characterizing at least a part of each transmitter path within the testing device.

5. The testing method according to claim 3, wherein the first parameters and the second parameters are S-parameters or T-parameters or Y-parameters or Z-parameters or H-parameters or ABCD-parameters or M-parameters or X-parameters or equivalent network parameters.

6. The testing method according to claim 1, wherein the extended channel correlation matrix $R_{\tilde{H}_{DL}}$ is normalized to achieve a specific channel power and has the structure $$R_{\tilde{H}_{DL}} = \frac{1}{c} * M * R_{H_{DL}} * M^H,$$

wherein c is a normalization constant with $c \in \mathbb{C}$,
M is a matrix with $M \in \mathbb{C}^{(Ntx*Nrx) \times (Ntx*Nrx)}$, and
MH denotes the Hermitian transpose of M.

7. The testing method according to claim 1,
wherein the transmitting means are considered as a Ntx-port network,
wherein the receiving means are considered as a Nrx-port network,
wherein the matrix M has the structure $$M = (((I_{Ntx} - \Gamma_{B,T} * S_{B,A})^{-1} * T_{B,T})^T \otimes (T_{UE,R} * (I_{Nrx} - S_{UE,A} * \Gamma_{UE,R})^{-1})),$$

wherein $I_{Ntx}$ is a Ntx×Ntx identity matrix,
$I_{Nrx}$ is a Nrx×Nrx identity matrix,
$S_{B,A}$ is the S-parameter matrix of the Ntx-port network,
$S_{UE,A}$ is the S-parameter matrix of the Nrx-port network,
$\Gamma_{B,T}$ is a diagonal matrix $\Gamma_{B,T} = \text{diag}\{[\Gamma_{B,T}^{(1)}, \ldots, \Gamma_{B,T}^{(Ntx)}]\} \in \mathbb{C}^{Ntx \times Ntx}$ comprising the reflection coefficients $\Gamma_{B,T}^{(1)}, \ldots, \Gamma_{B,T}^{(Ntx)}$ of each transmitter path,
$\Gamma_{UE,R}$ is diagonal matrix $\Gamma_{UE,R} = \text{diag}\{[\Gamma_{UE,R}^{(1)}, \ldots, \Gamma_{UE,R}^{(Nrx)}]\} \in \mathbb{C}^{Nrx \times Nrx}$ comprising the reflection coefficients $\Gamma_{UE,R}^{(1)}, \ldots, \Gamma_{UE,R}^{(Nrx)}$ of each receiver path,
$T_{B,T}$ is a diagonal matrix $T_{B,T} = \text{diag}\{[T_{B,T}^{(1)}, \ldots, T_{B,T}^{(Ntx)}]\} \in \mathbb{C}^{Ntx \times Ntx}$ comprising the transmission coefficients $T_{B,T}^{(1)}, \ldots, T_{B,T}^{(Ntx)}$ of each transmitter path,
$T_{UE,R}$ is diagonal matrix $T_{UE,R} = \text{diag}\{[T_{UE,R}^{(1)}, \ldots, T_{UE,R}^{(Nrx)}]\} \in \mathbb{C}^{Ntx \times Ntx}$ comprising the transmission coefficients $T_{UE,R}^{(1)}, \ldots, T_{UE,R}^{(Nrx)}$ of each receiver path,
The operator $(\ )^{-1}$ inverts a matrix, the operator $(\ )^T$ transposes a matrix, and the operator $\otimes$ denotes the Kronecker product of matrices.

8. A non-transitory computer-readable media storing computer-executable instructions that, when executed, cause one or more processors to perform acts comprising:
generating a first number of signals according to a number of transmitting means Ntx for a simulated transmission to a device under test,
simulating the transmission channels between said transmitting means and a number of receiving means Nrx of the device under test with the aid of an extended channel correlation matrix $R_{\tilde{H}_{DL}}$ comprising a channel correlation matrix $R_{H_{DL}}$, the extended channel correlation matrix $R_{\tilde{H}_{DL}}$ based on receive antenna characteristics of the device under test and/or transmit antenna characteristics, wherein the extended channel correlation matrix is normalized and numerically stabilized to avoid non-solvable equations, the extended channel correlation matrix $R_{\tilde{H}_{DL}}$ having the structure $$R_{\tilde{H}_{DL}} = \left[\frac{1}{c} * M * R_{H_{DL}} * M^H + a * I_{Ntx*Nrx}\right] / (1+a),$$

wherein c is a normalization constant with $c \in \mathbb{C}$,
a is a scaling factor with $a \in \mathbb{R}$,
$I_{Ntx*Nrx}$ is a (Ntx*Nrx)×(Ntx*Nrx) identity matrix,
M is a matrix with $M \in \mathbb{C}^{(Ntx*Nrx) \times (Ntx*Nrx)}$, and
$M^H$ denotes the Hermitian transpose of M, and
outputting a second number of faded signals to the device under test, the second number of faded signals corresponding to the number of receiving means Nrx of the device under test.

* * * * *